United States Patent [19]

DeCaussin

[11] Patent Number: 5,022,278

[45] Date of Patent: Jun. 11, 1991

[54] DRAW BAR MECHANISM

[75] Inventor: David E. DeCaussin, Northridge, Calif.

[73] Assignee: Fadal Engineering Co., Inc., No. Hollywood, Calif.

[21] Appl. No.: 499,721

[22] Filed: Mar. 27, 1990

[51] Int. Cl.$^5$ .............................................. B23B 31/10
[52] U.S. Cl. ...................................... 74/110; 409/233; 279/1 W; 279/51
[58] Field of Search ................ 409/233; 279/1 W, 51, 279/57, 58, 30, 75; 408/339 R, 240; 74/110

[56] References Cited

U.S. PATENT DOCUMENTS

| | | | |
|---|---|---|---|
| 3,533,636 | 10/1970 | Firestone | 279/50 |
| 3,615,100 | 10/1971 | Banner | 279/50 |
| 4,068,559 | 1/1978 | Schmid, Jr. et al. | 408/239 R X |
| 4,347,753 | 9/1982 | Claussen et al. | 409/233 |

Primary Examiner—Z. R. Bilinsky
Assistant Examiner—Robert Schultz
Attorney, Agent, or Firm—Blakely, Sokoloff Taylor & Zafman

[57] ABSTRACT

In a wedge ring mechanism for providing a collet clamping force in a machine tool spindle, a sleeve member retains a plurality of steel balls. A mechanical advantage is realized as the balls are wedged between obliquely inclined surfaces. The sleeve member is provided with a plurality of cylindrical passageways so that positive control over the motion of the balls is maintained at all times during both engagement and release of the collet clamping force, thereby obviating the need to pinch out the balls during release.

12 Claims, 3 Drawing Sheets

DRAW BAR MECHANISM

BACKGROUND OF THE INVENTION

1. Field of the Invention

This invention relates to the field of machine tools, and more particularly to a draw bar mechanism for operating a collet chuck.

2. Background Art

In an industrial machine tool having a rotating spindle, a cutting tool is generally retained in a collet chuck. A clamping force is commonly applied to the collet by a spring loaded draw bar. Due to design considerations such as bearing size and spindle loads, the spring size is subject to practical limitations. It becomes difficult to supply a sufficient collet clamping force and yet provide a reasonable service life. Therefore, in certain prior art draw bar spindles, the force of the spring is multiplied by means of a wedge ring mechanism. Such a mechanism is disclosed in U.S. Pat. No. 4,347,753. In this and similar devices, a number of steel balls are operatively engaged with bearing surfaces on the spindle, the draw bar and a sliding sleeve, respectively. The bearing surfaces are at relative angles of inclination such that a mechanical advantage is realized as the spring loaded sleeve causes the balls to be wedged between the bearing surfaces of the spindle and draw bar.

In the prior art wedge ring devices, a sleeve forces the balls to wedge between the spindle and the draw bar under the force of the spring, but upon release of the clamping force, the sleeve is no longer in positive contact with the balls. Therefore, in order to release the tool from the collet, a release force must be applied to the draw bar to "pinch" the balls out of position. The magnitude of the force that must be applied to the draw bar to pinch the balls out of position is a function of the relative angles of inclination between the bearing surfaces of the spindle and the draw bar, and can be a limiting factor in the design of the prior art devices.

Accordingly, it is one of the objects of the present invention to provide a wedge ring mechanism in which positive control is maintained over the motion of the balls at all times during both engagement and release of the collet clamping force.

SUMMARY OF THE INVENTION

In the draw bar mechanism of the present invention, a machine tool spindle is counterbored to receive a stack of Belleville springs which surround the draw bar. A sleeve member slides axially within the bore of the spindle and rests against the springs. A number of inclined cylindrical passageways are formed within the sleeve member, extending from a rear facing surface that is perpendicular to the axis of the spindle and through the outer circumference of the sleeve member. A ball bearing is retained within each of these passageways and protrudes above the rearward facing surface. A thrust spider slides over the draw bar and has a plurality of forward facing bearing surfaces that align with the protruding balls. The thrust spider is retained axially on the draw bar and is confined between the sleeve member and a knock-out cap that is bolted to the rear of the sleeve member.

The force of the compressed Belleville springs is transmitted directly to the sleeve and thence to the ball bearings within the inclined passageways. The spindle is provided with a conical surface at its rearward end so that as the collet engages the tool, the ball bearings are wedged outwardly between the conical surface and the bearing surfaces of the thrust spider. Due to the relative angles between the inclined passageways, the conical surface and the bearing surfaces of the thrust spider, a mechanical advantage is obtained so that the force applied to the thrust spider is substantially greater than the force imparted directly by the springs. This increased force is transmitted to the draw bar to provide the collet clamping force.

The collet is released by applying a counterforce to the knock-out cap. Since the knock-out cap is coupled directly to the sleeve, once the spring force is overcome, the sleeve is caused to move forward. Since the ball bearings are retained within the cylindrical passageways, forward motion of the sleeve immediately withdraws the balls from their wedged position between the thrust spider and the spindle. Accordingly, it is not necessary to apply additional force to the draw bar in order to pinch out the ball bearings.

DETAILED DESCRIPTION OF THE INVENTION

In the following description, for purposes of explanation and not limitation, specific numbers, dimensions, materials, etc. are set forth in order to provide a thorough understanding of the present invention. However, it will be apparent to one skilled in the art that the present invention may be practiced in other embodiments that depart from these specific details. In other instances, well known devices and components are not described in detail so as not to obscure the present disclosure with unnecessary detail.

Figure 1:
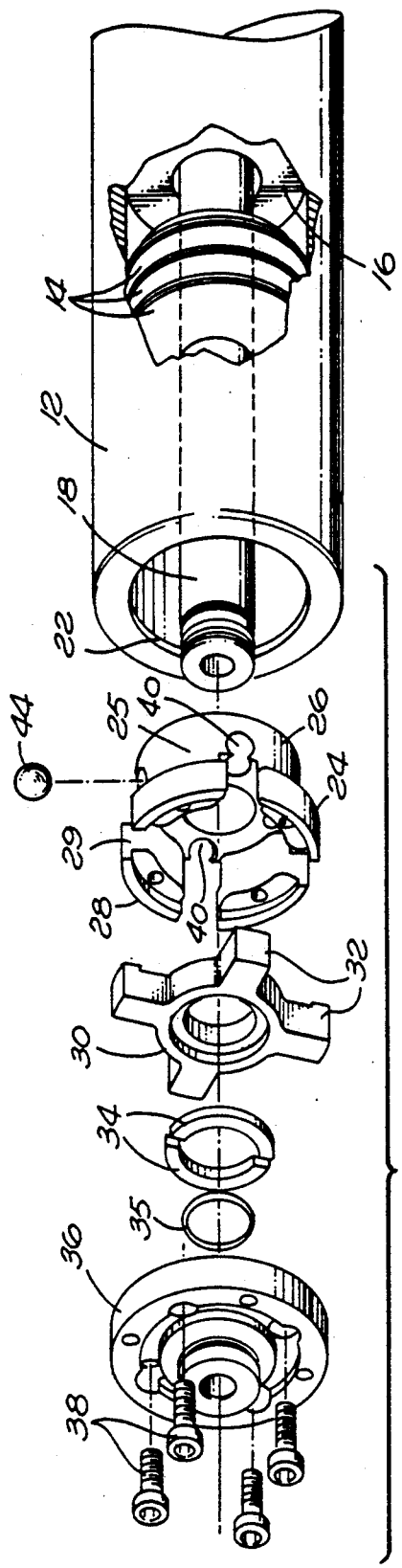
FIG. 1 is an exploded view of the principal components of the present invention.
Figure 2:
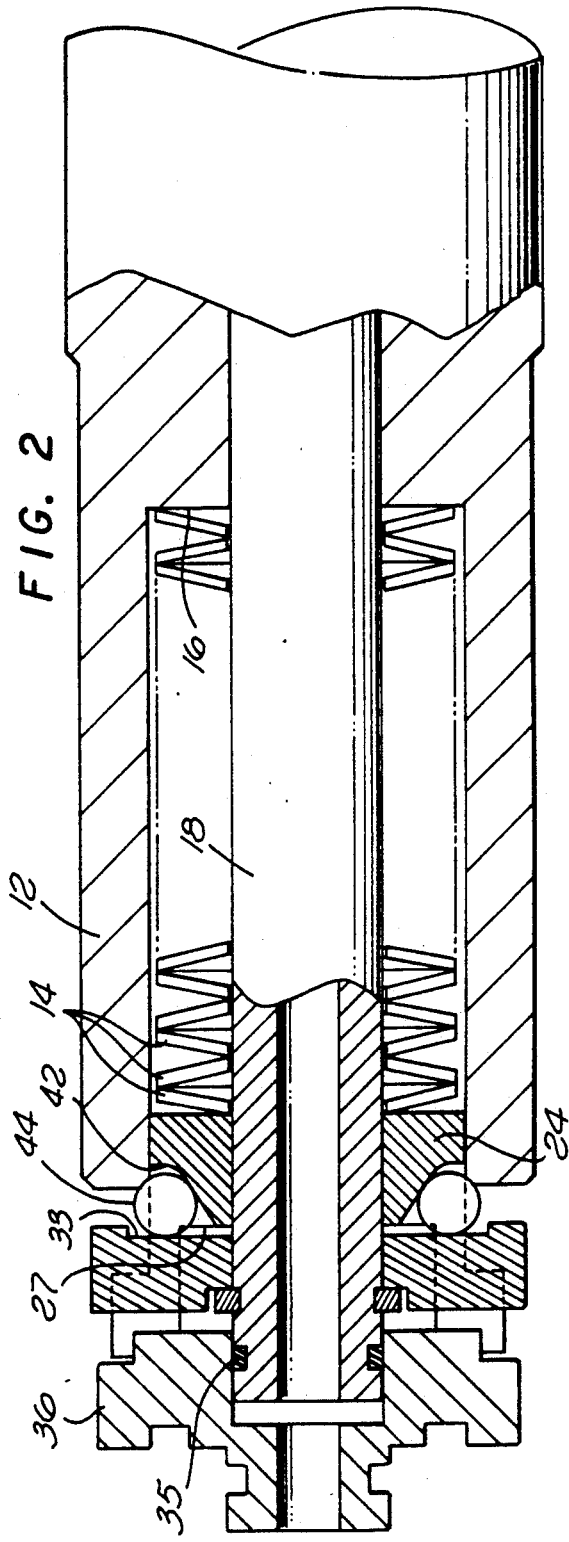
FIG. 2 is a cross-sectional view illustrating the present invention in an engaged position.

Referring to FIGS. 1 and 2, a draw bar mechanism according to the present invention is illustrated. A machine tool spindle comprises an elongated tube member 12 that is counterbored to receive a stack of Belleville springs 14. The springs rest against shoulder 16 formed within the bore of the spindle. Although the present invention is described in terms of an embodiment employing Belleville springs, it is to be understood that a coil spring or other force application means may be employed.

Draw bar 18 is an elongated rod-like member that extends through spindle 12 and about which springs 14 are stacked. At their respective forward ends, spindle 12 and draw bar 18 are coupled to a conventional collet chuck (not shown) for grippingly retaining a tool for rotation about the spindle axis. For convenience, the collet end of the spindle is referred to as the forward end. However, it is to be understood that, depending upon the configuration of the machine tool, the spindle may be oriented either horizontally or vertically or at some intermediate angle.

Figure 4:
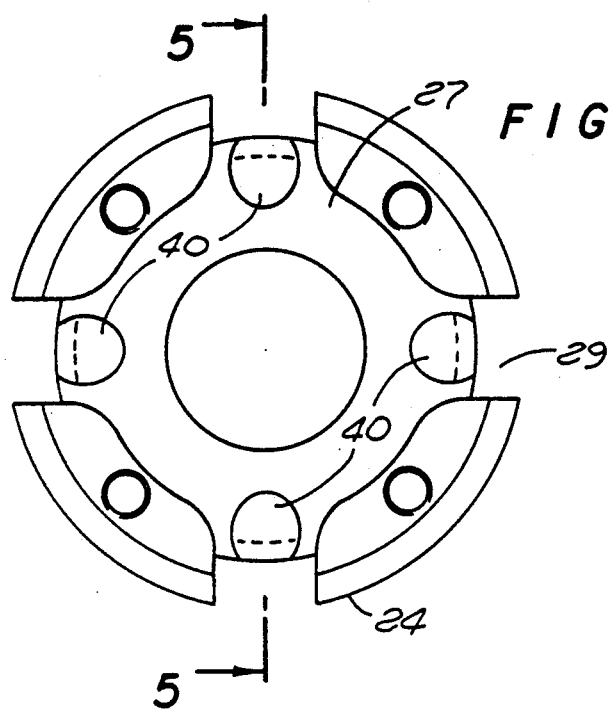
FIGS. 4 and 5 are elevation and cross-sectional views, respectively, of the sleeve member of the present invention.
Figure 5:
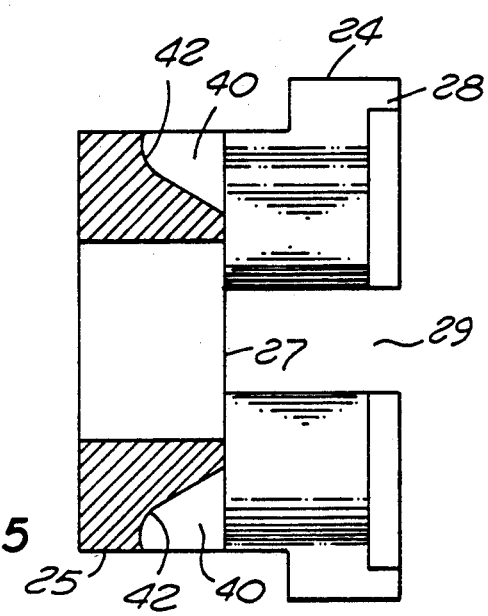

Referring now to FIGS. 4 and 5, sleeve member 24 includes a forward portion 26 having a diameter slightly smaller than the counterbored portion of spindle 12, so that it slides freely therewithin. A rearward portion 28 of sleeve 24 has a diameter greater than that of forward portion 26, thereby serving to limit the forward travel of sleeve 24 upon contact with the rear surface 20 of spindle 12. Rearward portion 28 of sleeve 24 is slotted crosswise to receive legs 32 of thrust spider 30. Thrust spider 30 is bored to slide over draw bar 18, as is forward portion 26 of sleeve 24. Thrust spider 30 is axially retained on draw bar 18 by means of spring retainers 34. Knock-out cap 36 is secured to rearward portion 28 of sleeve 24 by means of bolts 38. Thrust spider 30 is thus caged between sleeve 24 and knock-out cap 36. "O"-ring 35 provides a seal between draw bar 18 and end cap 36 for purposes of communicating a fluid through the bore of draw bar 18.

Sleeve 24 is milled to create a cylindrical passageway 40 at the base of each of slots 29. These passageways are inclined at an angle A with respect to the axis of sleeve 24, and penetrate through the outer wall 25 of the sleeve's forward portion 26. These passageways preferably terminate with a spherical surface 42 adjacent to the outer wall of forward portion 26. Ball bearings 44 are inserted within cylindrical passageways 40, but are prevented from passing through outer wall 25 by spherical surfaces 42.

Passageways 40 in sleeve member 24 may be conveniently machined with a single milling set-up. Sleeve 24 is oriented with its major axis parallel to the tool axis, denoted for purposes of this description as the z axis. Using a ball nose center cutting end mill, the tool is positioned above surface 27 and is fed simultaneously in both the z and one of the x or y axes. The tool is allowed to partially penetrate outer wall 25, thereby forming spherical surface 42.

Referring now primarily to FIG. 2, the draw bar mechanism is shown in its fully engaged position, i.e. with the collet chuck firmly gripping a tool. Springs 14 are compressed between shoulder 16 and sleeve 24, urging the sleeve rearwardly within the bore of spindle 12. The cylindrical walls of passageways 40 contact balls 44 and thereby transmit the spring force to the balls at an oblique angle A with respect to the axis of the spindle. Balls 44 protrude through surface 27 of sleeve 24 and contact bearing surfaces 33 of spider legs 32.

Balls 44 also protrude through the outer wall 25 of sleeve 24 where they contact the bore of spindle 12. The rearward end 20 of spindle 12 is beveled at an angle B with respect to the spindle axis to form conical surface 22. In the fully engaged position shown in FIG. 2, balls 44 are in contact with conical surface 22 of spindle 12. The force applied by springs 14 in combination with the inclination of passageways 40 causes balls 44 to become wedged between surfaces 22 and 33, resulting in a multiplication of force as applied to thrust spinder 30. Since thrust spider 30 is retained on draw bar 18 by retainers 34, this multiplied force is directly transmitted to draw bar 18 to act as the collet clamping force. Rearward travel of draw bar 18 is constrained by the action of the collet clamping on the tool. In order to insure three-point contact of balls 44 as described above when the tool is fully engaged in the collet, a spacer washer (not shown) may be inserted between thrust spider 30 and retainers 34.

Figure 6:
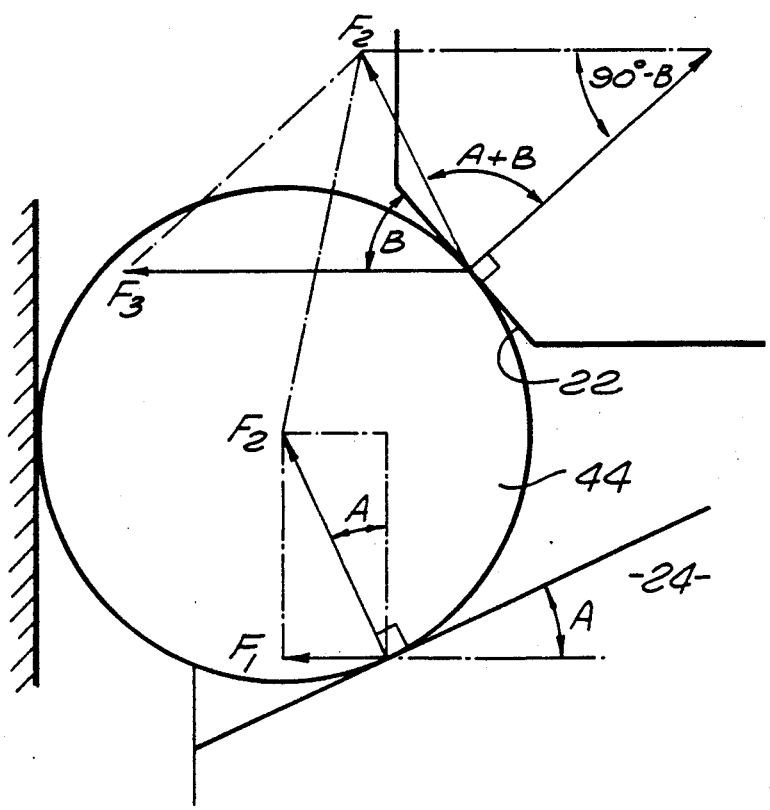
FIG. 6 illustrates the mechanical forces acting on the various components of the present invention.

With reference to FIG. 6, the forces acting on the elements of the spindle assembly as described above are calculated as follows. Let $F_1$ be the axial force exerted by springs 14. The force $F_2$ exerted on ball 44 normal to its point of contact with cylindrical passageway 40 is:

$$F_2 = F_1 / \sin A$$

The force $F_3$ exerted axially against bearing surface 33 of thrust spider 30, and thus applied to draw bar 18 is:

$$F_3 = \frac{F_2 \sin (A + B)}{\sin (90 - B)}$$
$$= \frac{F_1 \sin (A + B)}{(\sin A) \sin (90 - B)}$$

In a preferred embodiment of this invention, angle $A = 30°$ and angle $B = 45°$ yielding a mechanical advantage (the ratio of $F_1$ to $F_3$) of approximately 2.73.

Figure 3A:
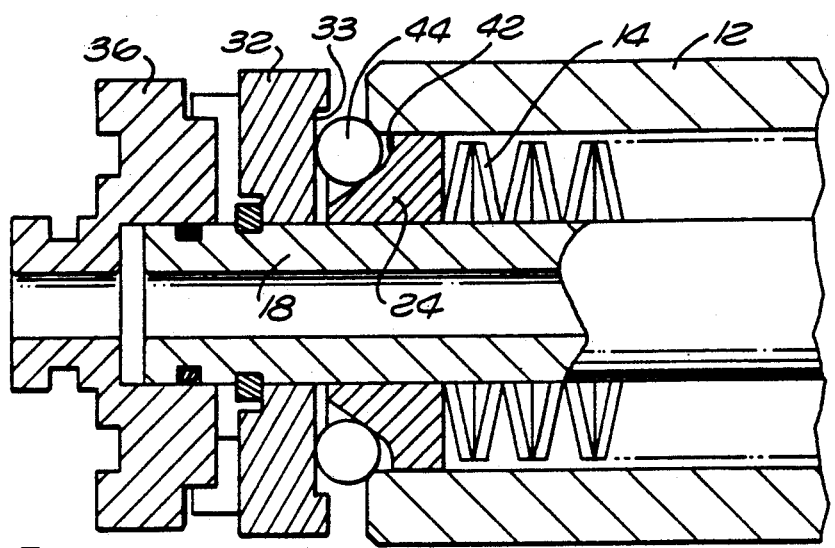
FIGS. 3a–3c illustrate the present invention at various stages as a collet clamping force is released.
Figure 3B:
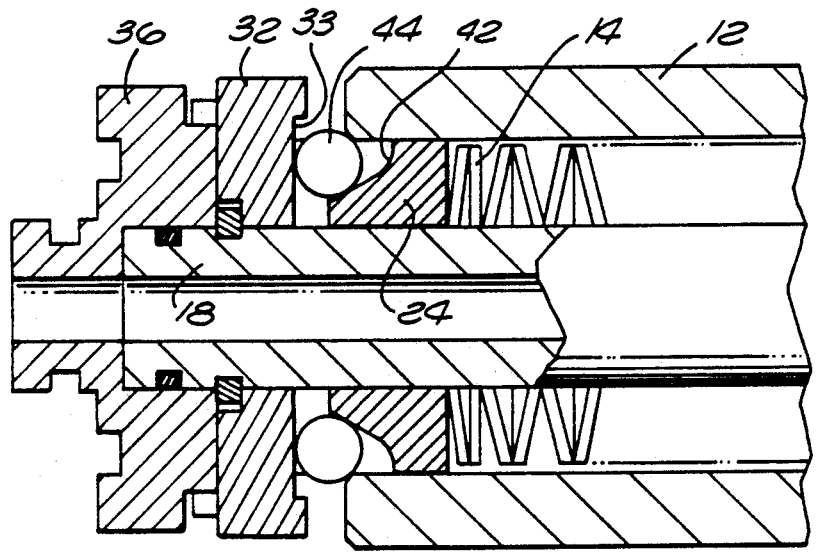
Figure 3C:
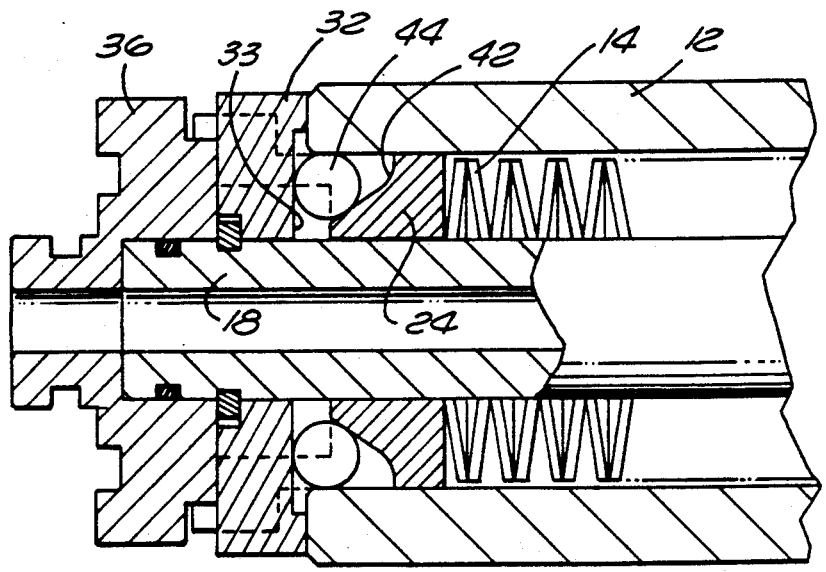

Release of the collet clamping force is sequentially illustrated in FIGS. 3a–3c. FIG. 3a is substantially the same as FIG. 2, showing the draw bar in a fully engaged position. A release force is applied to knock-out cap 36 by suitable mechanical, hydraulic or pneumatic means. Since knock-out cap 36 is rigidly secured to sleeve 24, the release force acts directly against springs 14. As the spring force is initially overcome, sleeve 24 begins to move in a forwardly direction as shown in FIG. 3b. Since balls 44 are captive within cylindrical passageways 40, forward movement of sleeve 24 causes balls 44 to be positively withdrawn from wedging engagement between surfaces 22 and 33. Forward motion of knock-out cap 36 and sleeve 24 is permitted to continue until cap 36 contacts the end of draw bar 18 and thrust spider 30. Continued forward motion of knock-out cap 36 is then imparted directly to draw bar 18. The forward stroke of draw bar 18 is limited when the legs 32 of thrust spider 30 contact end 20 of spindle 12. At such point, the collet is fully released to permit easy removal and replacement of the tool.

It will be recognized that the above described invention may be embodied in other specific forms without departing from the spirit or essential characteristics of the disclosure. Thus it is understood that the invention is not to be limited by the foregoing illustrative examples except as set forth in the appended claims.

I claim:

1. A draw bar of the type for operating a collet chuck comprising:

an elongated tube member having an axis and a conical surface at a first end of the tube member;

an elongated rod member coaxially disposed within said elongated tube member and axially moveable along a stroke between a first position and a second position, said first position corresponding to locking of the collet chuck and said second position corresponding to release of the collet chuck;

a sleeve member coaxially disposed between said tube member and said rod member having a plurality of inclined passageways extending radially therethrough;

a plurality of balls, one disposed within each of said passageways;

a spider member axially retained on said rod member having a plurality of radially projecting bearing surfaces facing said sleeve member for engagement with said balls;

spring means for biasing said sleeve member axially towards said first end of said tube member such that said balls are urged by contact within said inclined passageways outwardly into contact with said conical surface of said sleeve member and axially into contact with said bearing surfaces of said spider member;

whereby a biasing force of said spring means is amplified and transmitted through cooperative engagement of said sleeve member, said balls, said spider member and said rod member, to urge said rod member towards said first position.

2. The device of claim 1 wherein said passageways in said sleeve member have a circular cross section.

3. The device of claim 2 wherein said passageways have a reduced cross section where they exit an outer circumference of said sleeve member so as to limit outward travel of said balls.

4. The device of claim 2 wherein said bearing surfaces of said spider member are approximately perpendicular to said axis.

5. The device of claim 2 wherein said passageways in said sleeve member are inclined approximately 30° with respect to said axis.

6. The device of claim 2 wherein said conical surface of said tube member is inclined approximately 45° with respect to said axis.

7. A draw bar of the type for operating a collet chuck comprising:

an elongated tube member having an axis and a conical surface at a first end of the tube member;

an elongated rod member coaxially disposed within said elongated tube member and axially moveable along a stroke between a first position and a second position; said first position corresponding to locking of the collet chuck and said second position corresponding to release of the collet chuck;

a sleeve member coaxially disposed between said tube member and said rod member having: a first cylindrical portion for sliding engagement within said tube member, a second cylindrical portion having an outer diameter greater than said first portion, said first cylindrical portion having a plurality of inclined passageways extending radially therethrough, said second cylindrical portion having a plurality of radial slots aligned with said passageways;

a plurality of balls, one disposed within each of said passageways;

a spider member axially retained on said rod member having a plurality of radially projecting legs aligned with said slot, each of said legs having a bearing surface facing said sleeve member for engagement with a corresponding one of said balls;

spring means for biasing said sleeve member axially towards said first end of said tube member such that said balls are urged by contact within said inclined passageways outwardly into contact with said conical surface of said sleeve member and axially into contact with said bearing surfaces of said spider member;

whereby a biasing force of said spring means is amplified and transmitted through cooperative engagement of said sleeve member, said balls, said spider member and said rod member, to urge said rod member towards said first position.

8. The device of claim 7 wherein said passageways in said sleeve member have a circular cross section.

9. The device of claim 8 wherein said passageways have a reduced cross section where they exit an outer circumference of said sleeve member so as to limit outward travel of said balls.

10. The device of claim 8 wherein said bearing surfaces of said spider member are approximately perpendicular to said axis.

11. The device of claim 8 wherein said passageways in said sleeve member are inclined approximately 30° with respect to said axis.

12. The device of claim 8 wherein said conical surface of said tube member is inclined approximately 45° with respect to said axis.

* * * * *